3,215,638
CATALYTIC METHANOL SOLUTIONS OF ALUMINUM CHLORIDE AND ZINC CHLORIDE
Kenneth Andrew Dunn, Pampa, Tex., assignor to Celanese Corporation of America, New York, N.Y., a corporation of Delaware
No Drawing. Original application Jan. 22, 1959, Ser. No. 788,279, now Patent No. 3,069,433, dated Dec. 18, 1962. Divided and this application Nov. 5, 1962, Ser. No. 235,516
2 Claims. (Cl. 252—429)

This application is a division of U.S. Application Serial No. 788,279 filed January 22, 1959, now U.S. Patent No. 3,069,433, issued December 18, 1962.

This invention relates to a new and useful catalyst composition. More particularly this invention relates to aluminum chloride solutions adapted to be the catalyst for the preparation of beta propiolactone.

Anhydrous aluminum chloride is so well known as a catalyst that it has been made the subject for American Chemical Society Monograph No. 87, "Anhydrous Aluminum Chloride in Organic Chemistry" by C. A. Thomas, Reinhold Publishing Co., New York, 1941.

In keeping therewith, many patents suggest carriers for aluminum chloride. Patent 2,379,687, for example, suggests a mixture of aluminum chloride and pyridine hydrochloride. Patent 1,999,345 suggests aluminum chloride and cresylic acid. Patent 2,644,798 suggests a modified aluminum chloride suspended in methyl chloride. Other patents suggest particular aluminum chloride compositions relative to catalysis of specific reaction. Thus, patent 2,085,535 suggests catalyzing a polymerization by aluminum chloride dissolved in a sulfone, a ketone or a nitroparaffin. Patent 2,422,798 suggests catalyzing an alkylation process by a solution of aluminum chloride in an olefinic ketone.

As a result of all the prior art activity on aluminum chloride compositions, further investigation of aluminum chloride carriers would appear to offer small hope for significant improvements predicted solely on the catalyst carrier or solvent. Ordinarily the carrier is nothing more than a diluent for the catalyst, and may in fact constitute a contaminant in the ultimate product. At any rate, patents directed to the preparation of beta lactones (from ketenes and carbonyl compounds) with aluminum chloride as the catalyst accord little emphasis to the carrier for the catalyst. In particular, Patents 2,355,459 and 2,424,590 propose a large list of suitable catalyst solvents including: acetone, diethyl ether, methyl-ethyl ether, dioxane, ethyl chloride, ethylene dichloride, carbon disulfide or the like.

The lactone product itself has been used as the medium for carrying out the reaction (as in Patent 2,424,589). This is effective but in a continuous process requiring a continual addition of catalyst it is not convenient or even safe to add the catalyst in solid form to the reaction mixture or to prepare the necessary supply of solution of the catalyst in the highly reactive lactone. Accordingly, in continuous processes the aluminum chloride has been first dissolved in a carrier solvent and then the resulting solution has been added to reaction medium during the course of the reaction. Acetone, and to a lesser extent ether, appear to have been preferred as carrier solvents.

Notwithstanding such preferences, employment of acetone as the catalyst carrier poses many problems to the art. Acetone solutions of aluminum chloride are unstable; they darken rapidly and will gel overnight at room temperatures. For preparation of beta propiolactone on a commercial basis it has heretofore been necessary to make up a fresh catalyst solution every two or three hours. Moreover the 5% acetone solution of aluminum chloride customarily employed is relatively dilute. In the ultimately produced beta propiolactone, acetone from the catalyst solution constitutes a significant contaminant amounting roughtly to 3% of the product.

An object of the instant invention is to improve the production of beta propiolactone through catalysis with an aluminum chloride solution.

Other objects and advantages of this invention will be apparent from the more detailed description which follows. In this specification and claims all proportions are by weight unless otherwise indicated.

In accordance with one aspect of this invention methanol is used to dissolve the aluminum chloride. This makes possible the use of high concentrations of aluminum chloride in the solvent, for example solutions containing about 20% by weight of anhydrous aluminum chloride. Other catalytic ingredients such as zinc chloride may also be present in minor amounts, e.g. $\frac{1}{10}$ the weight of the aluminum chloride.

With the available wealth of prior art relating to catalyst uses for aluminum chloride and relating to carriers for aluminum chloride, it is somewhat surprising that methanol has been left unexplored heretofore. Without being bound thereto, it is theorized that this significant omission can be attributed to the statements in the prior art concerning the effects of admixture of aluminum chloride and methanol. Thus, the Thomas text in reporting on the solubility of aluminum chloride in methanol reports "boils; white ppt.," while Lloyd, Brown, Bonnell and Jones, J.C.S. 1928, page 661, report that "aluminum chloride when added to either methyl or ethyl alcohol gives an immediate violent evolution of hydrogen chloride." We have found that solutions which are highly effective catalytically can be made simply by cooling to remove the heat produced on mixing the aluminum chloride and methanol, the chloride being added gradually during mixing and the temperature being maintained at not above about 20° C. The resulting solution is clear and is just as active catalytically, for the preparation of propiolactone, as freshly prepared acetone solutions; on standing for several days the solution may turn slightly cloudy but it retains its catalytic activity. In preparing beta propiolactone, or other lactones from ketenes and carbonyl compounds, using the methanol solutions of this invention, the reactants and conditions disclosed by the prior art may be used. Furthermore, the methanol is easily removed, by distillation, from the products after the reaction.

When water is added to the methanol solutions of this invention the solutions remain clear, without precipitation. However the solution should be substantially anhydrous to preserve its highest catalytic activity and to reduce corrosion.

A most important advantage of methanol solutions lies in the attainment of higher aluminum chloride concentrations. In the preparation of propiolactone it has heretofore been the practice to add the catalyst as an acetone solution containing 5% by weight of acetone. It is desirable in the practice of this invention to use a catalyst solution containing at least about 15% of dissolved aluminum chloride, and preferably higher (e.g. about 18–20%). This greatly reduces the degree of contamination by the solvent.

An operating advantage exists, as well, because the acetone solutions of catalyst had to be freshly prepared every two to three hours, while without sacrificing catalytic activity methanol solutions can be prepared the night before in sufficient quantities to take care of the following day's run.

The following example is given to illustrate this invention further:

*Example*

A solution of aluminum chloride and zinc chloride in methanol was prepared, by slowly adding 17 parts of anhydrous aluminum chloride and 1 part of anhydrous zinc chloride to 82 parts of anhydrous methanol at a temperature of 20° C. with agitation and cooling to maintain the mixture at this temperature, and 24 parts of the resultant solution of catalyst was admixed with 1700 parts of beta propiolactone. Thereafter an equi-molar mixture of gaseous formaldehyde and ketene was passed through the solution at the rate of about 1700 parts per hour, the reaction mixture being maintained at a temperature of 28° C. The reaction was carried out continuously, with a continuous feed of formaldehyde and ketene, and a continuous makeup supply of catalyst solution to maintain a constant concentration of catalyst so that steady state conditions prevailed, in the conventional manner. Beta propiolactone was obtained in excellent yields.

It is to be understood that the foregoing detailed description is given merely by way of illustration and that many variations may be made therein without departing from the spirit of my invention.

Having described my invention, what I desire to secure by Letters Patent is:

1. A catalyst composition for the preparation of B-propiolactone essentially consisting of a solution containing about 15 to 20% by weight of substantially anhydrous aluminum chloride and minor amounts of zinc chloride in methanol.

2. The catalyst composition of claim 1 wherein the ratio of said anhydrous aluminum chloride and zinc chloride is about 10:1.

References Cited by the Examiner
UNITED STATES PATENTS

| | | | |
|---|---|---|---|
| 2,084,082 | 6/37 | Fitch | 252—429 |
| 2,424,589 | 7/47 | Steadman | 252—429 |
| 2,424,590 | 7/47 | Steadman et al. | 252—429 |
| 3,029,253 | 4/62 | Wheeler et al. | 252—429 |

TOBIAS E. LEVOW, *Primary Examiner.*

SAMUEL H. BLECH, *Examiner.*